United States Patent [19]

Grossauer

[11] Patent Number: 4,513,998
[45] Date of Patent: Apr. 30, 1985

[54] CONNECTING NIPPLE FOR CIRCUMFERENTIALLY RIBBED INSULATING TUBES

[76] Inventor: Alfred Grossauer, Korbackerweg 7, CH-5502 Hunzenschwil, Switzerland

[21] Appl. No.: 407,733

[22] Filed: Aug. 13, 1982

[30] Foreign Application Priority Data

Jul. 9, 1981 [CH] Switzerland ............ 5748/81

[51] Int. Cl.³ ............................................. F16L 37/00
[52] U.S. Cl. .................... 285/308; 285/403; 285/423; 285/DIG. 4; 285/DIG. 22
[58] Field of Search ........ 285/305, DIG. 4, DIG. 22, 285/308, 395, 423, 403

[56] References Cited

U.S. PATENT DOCUMENTS

| 1,383,303 | 7/1921 | Honen | 285/305 X |
| 4,368,904 | 1/1983 | Lanz | 285/305 X |
| 4,423,892 | 1/1984 | Bartholomew | 285/305 X |

FOREIGN PATENT DOCUMENTS 81 of 1912 United Kingdom ............... 285/403

Primary Examiner—Richard J. Scanlan, Jr.
Attorney, Agent, or Firm—McGlew and Tuttle

[57] ABSTRACT

A connecting nipple for engagement with a tubular member having a circumferential surface with a locking groove therein comprises a tubular part with a wall having an outer recess on its circumference and a bore intersecting the recess extending through the wall. A locking member is engageable in the recess and has a projecting portion engageable through the bore to the locking groove. A resilient deflecting portion is defined between the recess and the bore which must be displaced to permit insertion of the locking member and which effects the holding of the locking member in a locking position after it is inserted.

1 Claim, 13 Drawing Figures

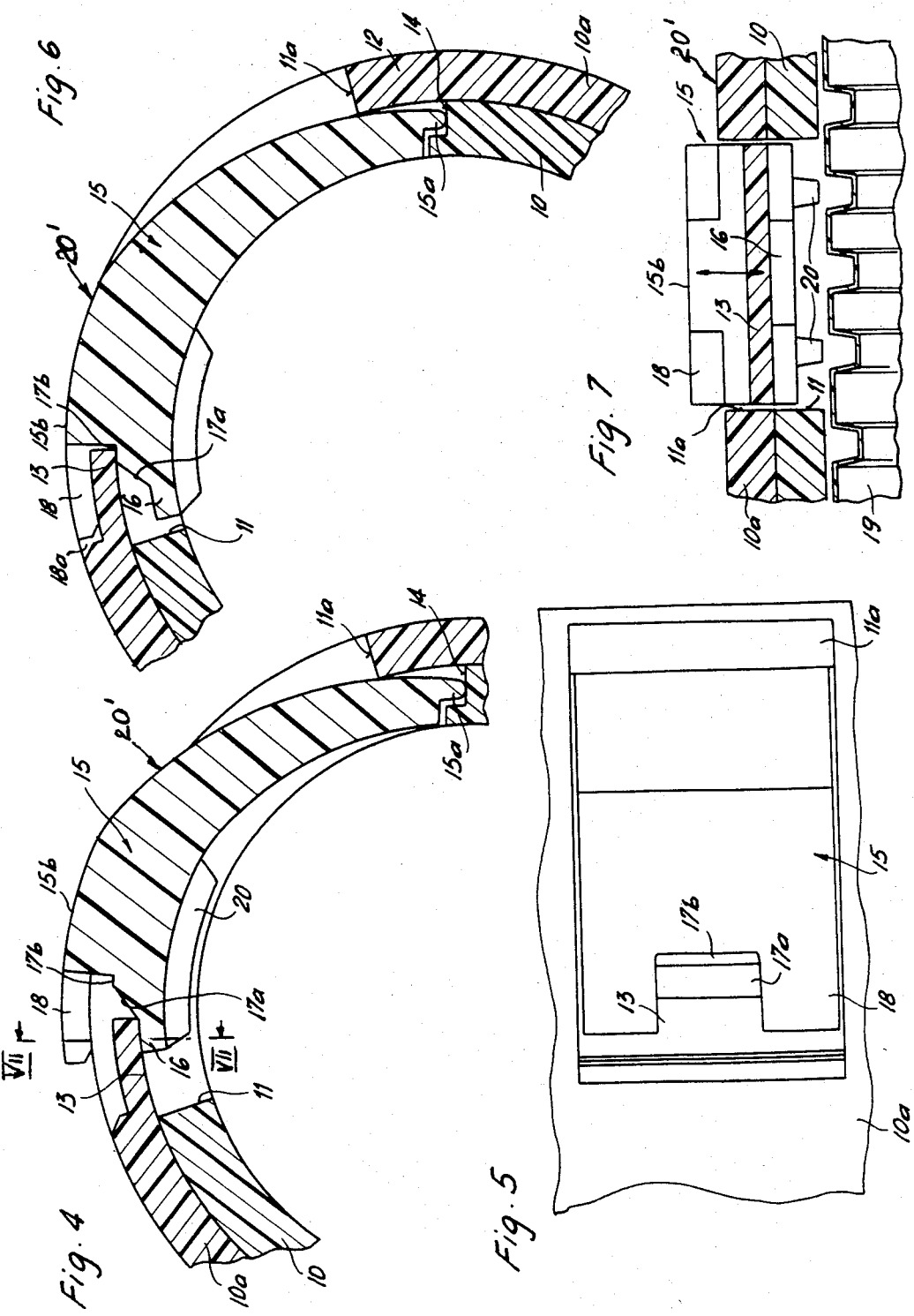

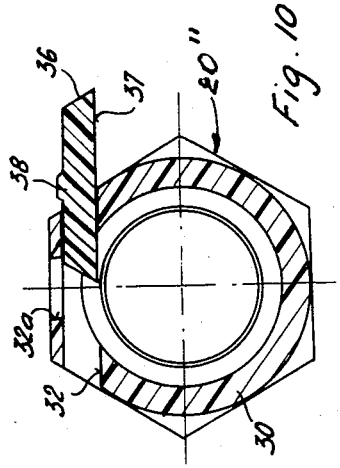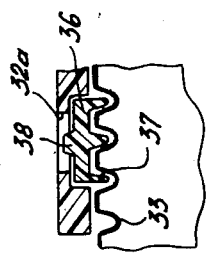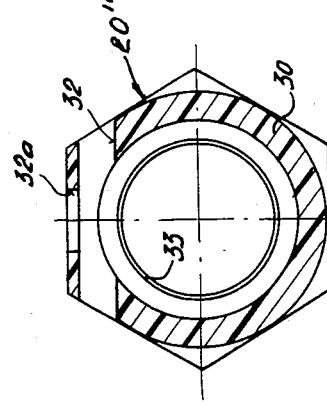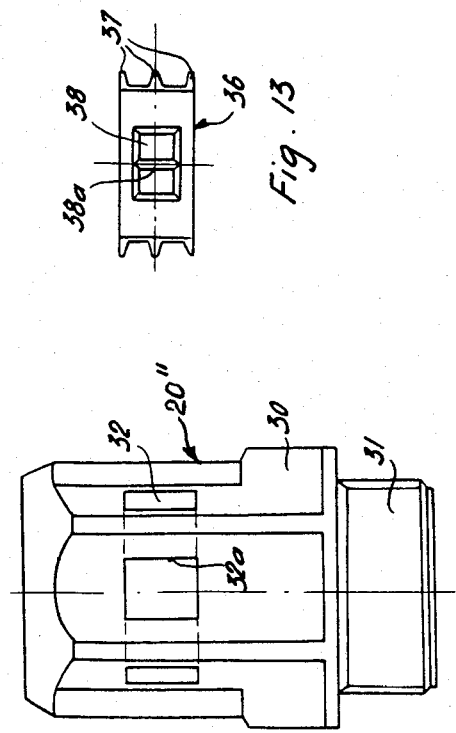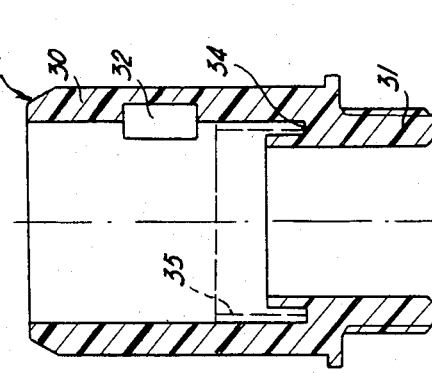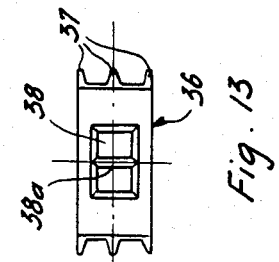

CONNECTING NIPPLE FOR CIRCUMFERENTIALLY RIBBED INSULATING TUBES

FIELD AND BACKGROUND OF THE INVENTION

The invention relates in general to pipe joints and in particular to a new and useful connecting nipple for circumferentially ribbed insulating tubes.

If the relatively thin-walled insulating tubes which, as is well known, serve the purpose of enclosing electrical cables, are to be joined to electrical equipment, a connecting nipple must be interposed having on one side a threaded connection for securing to the housing wall of the electrical equipment, and on the other side a socket for receiving the end of the insulating tube. Such nipples should establish a connection which can no longer be unlocked, except with the use of a tool and prior art construction of this kind are very expensive.

The present invention is directed to a nipple permitting interconnection of circumferentially ribbed insulating tubes by simple manipulation and without a tool, while making a disconnection of the nipple from the tube impossible without the use of a suitable tool.

For this purpose, the invention provides in a nipple comprising an inwardly shouldered piece of pipe having a threaded connecting portion and a receiving socket portion, that has a projection member engageable in a groove or recess of a tube to be connected and which is held engaged until separated by a tool. The locking element, made of a plastic, as is the piece of pipe, may be designed as a pushbutton or a spring arm which can be pushed radially inwardly into a flush or sunken effective position. Slides tangentially engageable into corresponding holes of the socket portion may also be provided as locking elements.

Accordingly it is an object of the invention to provide a connecting nipple for engagement with a tubular member which includes means for locking the connecting nipples to the tubular member and a lock element which when engaged must be forceably disengaged, for example by a tool.

A further object of the invention is to provide a connecting nipple which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a view similar to FIG. 1 of another embodiment of the invention;

FIG. 5 is a plan view of the embodiment shown in FIG. 4;

FIG. 6 is a view similar to FIG. 4 showing the locking member in an engaged position;

FIG. 7 is an axial sectional viiew taken along the line VII—VII of FIG. 4;

FIG. 8 is a sectional view of another embodiment without the locking element;

FIG. 9 is detail of a portion of the nipple shown in FIG. 8 with a locking element;

FIG. 10 is a section similar to FIG. 8 showing the initial stage of insertion of the locking member;

FIG. 11 is an axial sectional view of the nipple;

FIG. 12 is a side elevational view of the nipple shown in FIG. 8; and

FIG. 13 is a plan view of the locking element of the embodiment of FIGS. 8–12.

DESCRIPTION OF THE PREFERRED EMBODIMENTS

Figure 1:
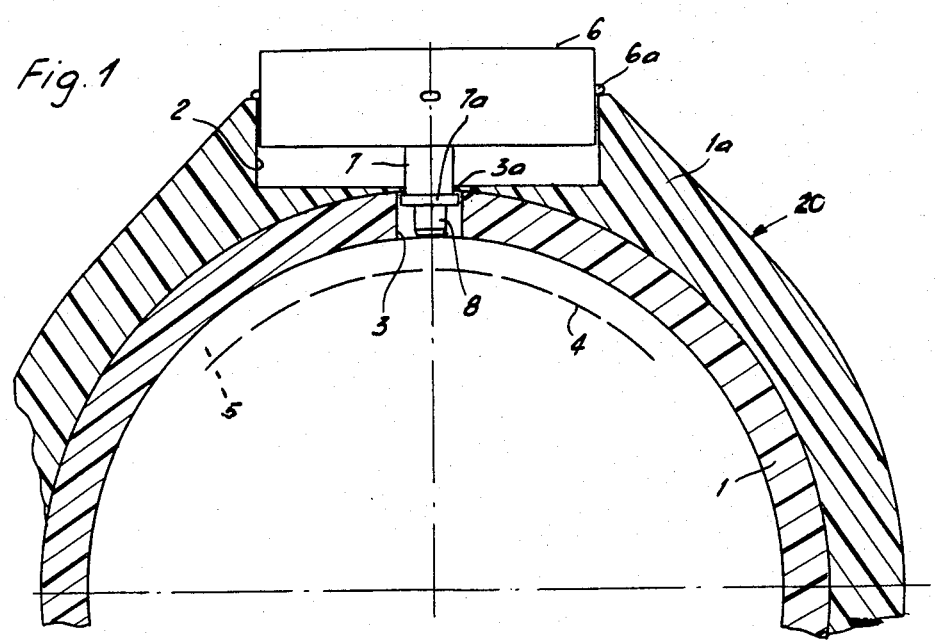
FIG. 1 is a partial sectional view of a connecting nipple constructed in accordance with the invention.
Figure 2:
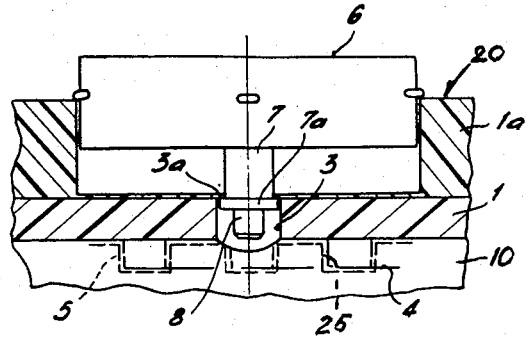
FIG. 2 is a partial view of the device shown in FIG. 1 indicating the connection thereof to an insulating tube.
Figure 3:
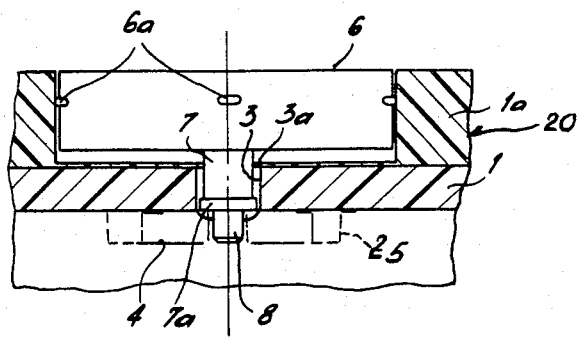
FIG. 3 is a view similar to FIG. 2 showing the locking element in an engaged position.

Referring to the drawings in particular the invention embodied therein in FIGS. 1–3 comprises a connecting nipple generally designated 20 for engagement with a tubular member or insulating tube 5 having an outer recess or a plurality of grooves 25 at spaced longitudinal or circumferential locations. Nipple 20 is locked to the tube 5 by means of a locking element 6 having a locking bolt portion 7 with an extending pin part 8 which extends through a bore 3 of an inner socket portion 1 of the nipple 20 and deflects a lip 3a formed by the bottom part of a bulging portion 1a of the nipple 20 in order to enter into the bore 3. After insertion the lip 3a falls behind a protuberance or annular collar 7a and prevents withdrawal of the locking member. Similarly projection 6a of the locking member 6 become wedged against a wall bounding the recess 2 so that the pin portion 8 remains engaged in a groove 25 of the insulating tube 5.

In the embodiment of FIGS. 1–3, a socket portion 1 of a nipple 20 (the threaded portion is not shown) is provided, intermediate its longitudinal extension, with an outwardly projecting ridge- or bulge-like protuberance 1a. In protuberance 1a, a recess 2 is provided having a square or circular plan. At the center of the recess 2, extending down to the base of protuberance 1a, a radial bore 3 is provided through the wall of the socket portion 1. The position of the bottom of a groove 25 of a circumferentially ribbed insulating tube 10 to be received in the socket portion 1 is indicated at 4. At the bottom of the recess 2, a radial bore 3 is somewhat narrowed or partially closed by a projecting lip 3a. A push plate 6 of the locking element, which, in the ineffective position of the element, engages recess 2 to about one half the depth thereof, is provided with a bolt 7, which carries a collar 7a at a level below lip 3a and terminates with a pin 8. In the ineffective position shown in FIGS. 1, 2 of the locking element, pin 8 extends entirely within the thickness range of the wall of socket portion 1. A circumferentially ribbed insulating tube 5 fitting the hollow of socket portion 1 is inserted into the socket, so that one of the grooves 25 formed between two circumferential ribs of the tube comes to be aligned with bore 3. Then, an actuation with a finger is sufficient to engage push plate 6 into a position flush with the outside surface of protuberance 1a. Peripheral cams 6a or ribs on the push plate 6 which initially prevented push plate 6 from falling into recess 2, now act as clamping elements preventing the plate from being removed again from recess 2 by hand. While pushing plate 6 in, pin 8 is pressed into the subjacent circumferential groove of the insulating tube and positively prevents the insulating tube from being axially separated from the nipple. It will be understood that this locking element designed as a pushbutton may also be provided with a plurality of pins 8 and bolts 7 carried by the push plate 6, which engages each in one of the circumferential grooves of the insulating tube.

Another embodiment of nipple 20' in which the locking element can be brought into its effective position by a radial finger push and cannot be released again without the use of a tool, is shown in FIGS. 4 to 7. The nipple 20' again comprises a threaded portion (not shown) and a socket portion 10 with a protuberance 10a. Both the socket wall and the protuberance are provided with recesses or openings 11 and 11a respectively which, in a plan view, are both rectangular, however, do not quite coincide. In the protuberance 10a, at one end of opening 11a, a web 12 projecting beyond the adjacent end of socket wall 10, is provided, and at the other end of opening 11a, a tongue 13 is formed projecting beyond the subjacent end of the socket wall. The limiting wall portion of opening 11 extending in the zone of web 12 is shouldered and forms a radially extending ledge 14. This ledge 14 forms the fulcrum for an arcuate locking arm 15 bearing thereon by a bottom rib 15a. Arm 15 fits openings 11, 11a and grows larger to a thickened push portion 15b. This thickened portion 15b comprises a radially inner edge portion 16 to be engaged below tongue 13 of protuberance 10a, which is followed by an incline 17a terminating in a shoulder 17b; on its outside, push portion 15b comprises two lateral tongues 18 which are intended to engage over tongue 13 of protuberance 10a. The radial thickness of push portion 15b corresponds to the total thickness of the protuberance and the socket wall. On its inside, push portion 15b is provided with two (or more) ribs 20 which extend in the circumferential direction of the socket portion and are comfortable, both in width, height and spacing, to the circumferential grooves of insulating tube 19 (FIG. 7) to be received therein.

The operation of such a locking element provided with two ribs 20 may readily be learned from FIGS. 4, 6 and 7. In the ineffective position of the locking element (FIGS. 4 and 7), ribs 20 are located entirely outside the hollow of socket portion 10, so that insulating tube 19 can be introduced without hindrance. By pushing portion 15b in, locking element 15 is pivoted about its fulcrum 14 inwardly so that ribs 20 engage subjacent grooves of insulating tube 19. During this motion, incline 17a slides below tongue 13 until the tongue comes to engage shoulder 17b thus preventing the locking element from pivoting back (FIG. 6). From this position secured by the cooperation of tongue 13 with shoulder 17b, locking element 15 can be released only by the prying effort of a tool applied in the gap 18a between protuberance 10a and tongue 18.

Another embodiment is shown in FIGS. 8–13. The nipple 20 comprises a threaded portion 31 and a cylindrical body defining a socket portion 30 which is provided with a hexagonal collar. A tangentially extending hole 32 is provided through the socket portion and defines a socket wall. The hole 32 communicates centrally with the hollow of socket portion 30 and, in addition, with the outside through a bore 32a of the socket wall Hole 32 is disposed to have its bottom at a level corresponding to the radial depth of the circumferential grooves of an insulating tube 33 (FIG. 9) to be inserted. In the zone where the hollow of socket portion 30 meets the narrower hollow of threaded portion 31 of the nipple, a circumferential groove 34 is formed which is open at the socket side and, as indicated in FIG. 11, provides a seat for a seal ring 35 against which insulating tube 33 can apply. In this design, the locking element is a locking slide 36 of plastic. Slide 36 is provided with three longitudinal ribs 37 on its underside and is dimensioned to fit hole 32 of socket portion 30. A projection or cam 38 formed on the top of slide 36 makes the insertion of the slide intentionally difficult but still possible by hand, due to the elasticity of the plastic. It will be understood that here again the three ribs 37 are conformable in height, width, and spacing to the outside contour of insulating tube 33, so that after inserting slide 36, an introduced insulating tube is satisfactorily secured against axial separation from the nipple. Cam 38 which, upon the insertion of slide 36, protrudes into bore 32a, prevents the slide from being removed by hand. To be able to effect such a removal if needed, cam 38 is provided with a notch 38a where a proper tool, such as a screwdriver, may be applied to press the cam in and push slide 36 out of hole 32.

To insure a tight sealing contact between insulating tube 33 and the nipple, an elastic seal ring 35 is provided as already mentioned. The axial length of this ring is such that as the insulating tube butts against seal ring 35, the circumferential grooves of the insulating tube are axially offset, for example by one half the groove width, relative to the locations where the ribs of the slide 36 to be inserted will extend; then, just before bringing this slide into its locking position, the insulating tube is pushed slightly inwardly, against elastically yielding seal ring 35, whereupon the slide is shifted into its final locking position. In this way, inserted slide 36 not only secures the insulating tube within the nipple, but also ensures a tight connection therebetween.

While specific embodiments of the invention have been shown and described in detail to illsutrate the application of the principles of the invention, it will be understood that the invention may be embodied otherwise without departing from such principles.

What is claimed is:

1. A connecting nipple for engagement with a tube having a circumferential surface with a locking groove therein, comprising a cylindrical body defining a socket portion and having an open end to which the tube is engageable, a tangential hole extending through said socket portion tangentially into an interior thereof and defining a socket wall, a locking slide engageable in said tangential hole and being of a size to engage in a locking groove of the tube, said socket wall having a bore therethrough overlying said locking slide when said locking slide is in said hole, said locking slide having a projection thereon which extends in said bore with said slide in said hole for holding said slide in said hole, said projection being sufficiently elastic so that said slide can be forced into said tangential hole while said projection passes said socket wall into said bore.

* * * * *

UNITED STATES PATENT OFFICE
CERTIFICATE OF CORRECTION

Patent No. 4,513,998            Dated April 30, 1985

Inventor(s) Alfred Grossauer

It is certified that error appears in the above-identified patent and that said Letters Patent are hereby corrected as shown below:
       On the title page;

The filing date of the priority application - Switzerland 5748/81 - is September 7, 1981.

Signed and Sealed this

First Day of October 1985

[SEAL]

*Attest:*

*Attesting Officer*

DONALD J. QUIGG

*Commissioner of Patents and Trademarks—Designate*